(12) United States Patent
Podgorsky et al.

(10) Patent No.: US 6,976,188 B2
(45) Date of Patent: Dec. 13, 2005

(54) SYSTEM AND METHOD FOR CREATING A CUSTOMIZED POWER ON SELF TEST (POST) PROGRAM FOR USE IN A COMPUTING SYSTEM

(75) Inventors: Oleksandr Podgorsky, Lilburn, GA (US); Sudhakar Otturu, Hillsboro, OR (US)

(73) Assignee: American Megatrends, Inc., Norcross, GA (US)

( * ) Notice: Subject to any disclaimer, the term of this patent is extended or adjusted under 35 U.S.C. 154(b) by 464 days.

(21) Appl. No.: 10/288,412

(22) Filed: Nov. 4, 2002

(65) Prior Publication Data

US 2003/0110415 A1    Jun. 12, 2003

Related U.S. Application Data

(60) Provisional application No. 60/340,075, filed on Nov. 2, 2001.

(51) Int. Cl.[7] .............................................. G06F 11/00
(52) U.S. Cl. .............................. 714/36; 713/2; 717/106
(58) Field of Search ............................... 714/36; 713/1, 713/2; 717/106, 107, 109, 110, 113; 712/227

(56) References Cited

U.S. PATENT DOCUMENTS

| | | | |
|---|---|---|---|
| 5,850,562 A * | 12/1998 | Crump et al. .................. | 713/1 |
| 6,052,800 A * | 4/2000 | Gentile et al. ................ | 714/36 |
| 6,065,131 A * | 5/2000 | Andrews et al. ............ | 713/600 |
| 6,257,774 B1 * | 7/2001 | Stack .......................... | 717/110 |
| 6,785,808 B2 * | 8/2004 | Huntington et al. ........... | 713/2 |

* cited by examiner

Primary Examiner—Scott Baderman
Assistant Examiner—Joshua Lohn
(74) Attorney, Agent, or Firm—The Hope Law Firm, LLC

(57) ABSTRACT

The present invention provides systems and methods for creating a customized POST program for use in a computing system. Specifically, the system of the present invention includes each of the routines for POST stored in different locations with associated calls for locating and running the routines. Each routine includes an instruction section containing editable data that indicates the sequence that the routine should be run in POST in relation to the other routines. The system further includes a POST program builder that builds a POST program that includes calls to each routine. The calls for each routine are stored in sequence in the POST program based on the information from the instruction segment associated with each routine. As such, the sequence with which each routine is run by POST can be changed by changing the information stored in the instruction segment associated with each routine and new routines can be added by supplying the code for the routine and providing instructions as to when the routine should be run by POST.

27 Claims, 15 Drawing Sheets

Figure 4C

Elink Properties

☑ Active  Belong To: Core ▸ eLink: C

Position with respect to Parent
Parent: BIOS_POST ▸
○ Before
○ Replace
● After

Output Format
● FAR Function  ○ Table   [Macro...]

Output Location
Segment: ▸
☐ BootBlock  ☐ Non-BootBlock eLinkID: 0003h   Priority#: 2

Source File: Build\Post.asm  [...]

Help: ◂ ▸

[Dependency...]  [OK]  [Cancel]

Figure 4D

Elink Properties

☑ Active  Belong To: Core ▸ eLink: D

Position with respect to Parent
Parent: BIOS_POST ▸
○ Before
○ Replace
● After

Output Format
● FAR Function  ○ Table   [Macro...]

Output Location
Segment: ▸
☐ BootBlock  ☐ Non-BootBlock eLinkID: 0004h   Priority#: 3

Source File: Build\Post.asm  [...]

Help: ◂ ▸

[Dependency...]  [OK]  [Cancel]

SYSTEM AND METHOD FOR CREATING A CUSTOMIZED POWER ON SELF TEST (POST) PROGRAM FOR USE IN A COMPUTING SYSTEM

RELATED APPLICATIONS

The present application claims priority to the provisional application having Ser. No. 60/340,075 filed on Nov. 2, 2001 and entitled SYSTEM AND METHOD FOR CREATING A CUSTOMIZED POWER ON SELF TEST (POST) PROGRAM FOR USE IN A COMPUTING SYSTEM, the contents of which are incorporated herein by reference.

FIELD OF THE INVENTION

The present invention relates generally to generation of a POST program used in initialization of computing systems, and more particularly, to systems and methods that generate a customized POST program based on the particular configuration of the computing system in which the POST program is to be used.

BACKGROUND OF THE INVENTION

In most computing systems, low level instruction code is used as an intermediary between the hardware components of the computing system and the operating software and other high level software executed on the computing system. This low level instruction code is known as BIOS, (Basic Input Output System). BIOS provides a set of software routines that allow high level software to interact with the hardware components of the computing system using standard calls.

An important function of BIOS is the initialization of the computing system. As part of this initialization process, BIOS performs a number of tasks, such as initializing and testing the hardware components of the computing system and starting the operating system resident in the computing system. The initialization and testing of the hardware is performed by a routine referred to as Power On Self Test (POST). POST is a series of functions or routines that perform various initialization and tests of the hardware. For example, POST includes code for testing the CPU, math coprocessor, timer ICs, DMA controllers, TRQ controllers, etc. of the motherboard of the computer. Further, POST performs various memory checks and initializations. POST also tests and initializes various devices that may be installed in the computing system, such as video ROM, network adapter cards, SCSI adapter cards, etc. If these devices are present, their contents are tested with a checksum test and initialization of the devices. Additionally, POST may include routines for the display of manufacturer logos and other information to the user during POST operation. After POST has finished, BIOS initiates the operating system of the computer.

A noted problem with conventional POST software design is that it must be specifically configured for the architecture of the computing system in which it is used. Specifically, different computer hardware manufacturers use different hardware designs and include different types of hardware in their systems. For proper initialization of a computing system, the POST program must be designed to perform initialization and testing of the various hardware components in different sequences for different computing systems based on their specific designs. For example, one motherboard design may require initialization of the CPU and DMA controllers prior to initialization of the timers for the IC's and IRQ routing, while another motherboard design may require initialization of IRQ routing prior to initialization of the DMA controllers. In light of this, POST designers must work in cooperation with motherboard and computing system designers to create a POST program that is compatible with the particular computing system's hardware designs and requirements.

Further, many hardware manufacturers also wish to display different information to the user during POST operation. For example, the maker of the video adapter card may wish to display their company logo during initialization of the card, or the manufacturer of the computing system may wish to display their company logo during start up. This displayed information may change overtime. For example, with each new generation of hardware, the manufacture may wish to alter the logo and other information displayed to the user.

In light of this, most POST programs are specifically designed to operate within a given computing system configuration. Specifically, during development, POST designers receive information from the hardware designers concerning the exact configuration of the hardware and the ordering of initialization of each piece of hardware. The POST designer may also receive information for display of logos and other information to be displayed during POST. POST designers must then alter the existing base code of POST to implement the specific changes needed to operate POST in the computing system. These alterations may include rewriting of present code, insertion of new code between existing code modules, and deletion of modules altogether.

As with many manufactured products, customization of the product has associated time and cost. Specifically, not only are their cost and time associated with the actual rewriting of the software, there are also concerns with debugging, validation, and certification of the software, once completed. Although many of the existing routines in POST may not be affected by rewrites, the entire POST software typically must be tested and validated prior to shipment. Most quality assurance programs require that any changes to the software will typically require testing and verification of the entire software. Software testing and verification is a time intensive and costly procedure that can significantly add to the price of the software and delay shipment.

SUMMARY OF THE INVENTION

The present invention overcomes many of the problems associated with customization of POST software for use in a specific computing system. Specifically, the present invention provides systems and methods that reduce the time required for configuration of the software, as well as testing and verification. Specifically, the systems and methods of the present invention separate the different routines of the POST program into individual units, each stored in different locations in a computer readable medium. A pointer or call is associated with each routine indicating the location in the computer readable medium where the routine is stored.

Importantly, each routine includes two separate sections; a source code section and an instruction section. The source code section of the routine contains the source code used to perform the functions of the routine. The instruction section of the routine includes information that explains when and how the routine is to be used in the POST program. The instruction section of each routine is editable. As such, the routine can be configured with proper information indicating when the routine is to be run during the POST program. In this regard, the POST designer receives specific information from the motherboard and computing system designers related to the specific test and initialization operations and the sequence of operations to be performed by POST for the computing system. The POST designer, using this information, edits the instruction section for each routine indicating when the routine should be called and run in POST. The System then creates a POST program having calls for each of the routines, where the calls are in a sequence corresponding to the instruction associated with each routine.

In addition to the separating the routines into separate locations on the computer readable medium, the apparatus of the present invention also includes computer program code stored on a computer readable medium that is used to build the POST program. In building a customized POST program for the computing system, this POST program builder in a POST building mode, accesses the instruction section of each routine and from the information in these sections determines the proper sequence in which the routines are to be called during POST. The program builder then creates a POST program file that includes the pointer or call for each routine to be used in POST listed in the proper sequence. As such, when the customized POST program is run on the computing system, the program calls each of the routines in the desired sequence to perform the POST initialization and testing of the hardware components of the computing system.

As discussed, the system and method of the present invention first separate the individual routines of the POST into separate program modules that are stored in different locations in the computer readable medium and provides a call or pointer indicating the location of the routines. This is advantageous in terms of testing and validation of the POST program. Specifically, because each of the routines is located in different sections of memory, only those routines that are altered during the POST design need to be tested and validated. Additionally, new routines, such as the manufacturer's logo etc. may be added to POST by storing the routine for the logo in memory, and providing in the instruction section of the routine instructions for placement of the call or pointer associated with the new routine in the customized POST program.

The system and method of the present invention also offers several advantages in providing software patches and new versions of the POST program to the user. Specifically, once a version of the POST program has been shipped with the computing system to a customer, updates and revisions to a particular routine can be made without requiring replacement of the entire POST program. Instead, only the revised or newly added routines need be sent to the customer. In this instance, the instruction section for each routine sent includes information indicating to the program generator where the routine is to be added to the existing POST program. The instruction section may include information informing the program generator that the current routine replaces an existing routine or it may include information explaining where in the sequence of the routines in the POST that the call or pointer for this routine should be inserted.

BRIEF DESCRIPTION OF THE DRAWINGS

Figure 1:
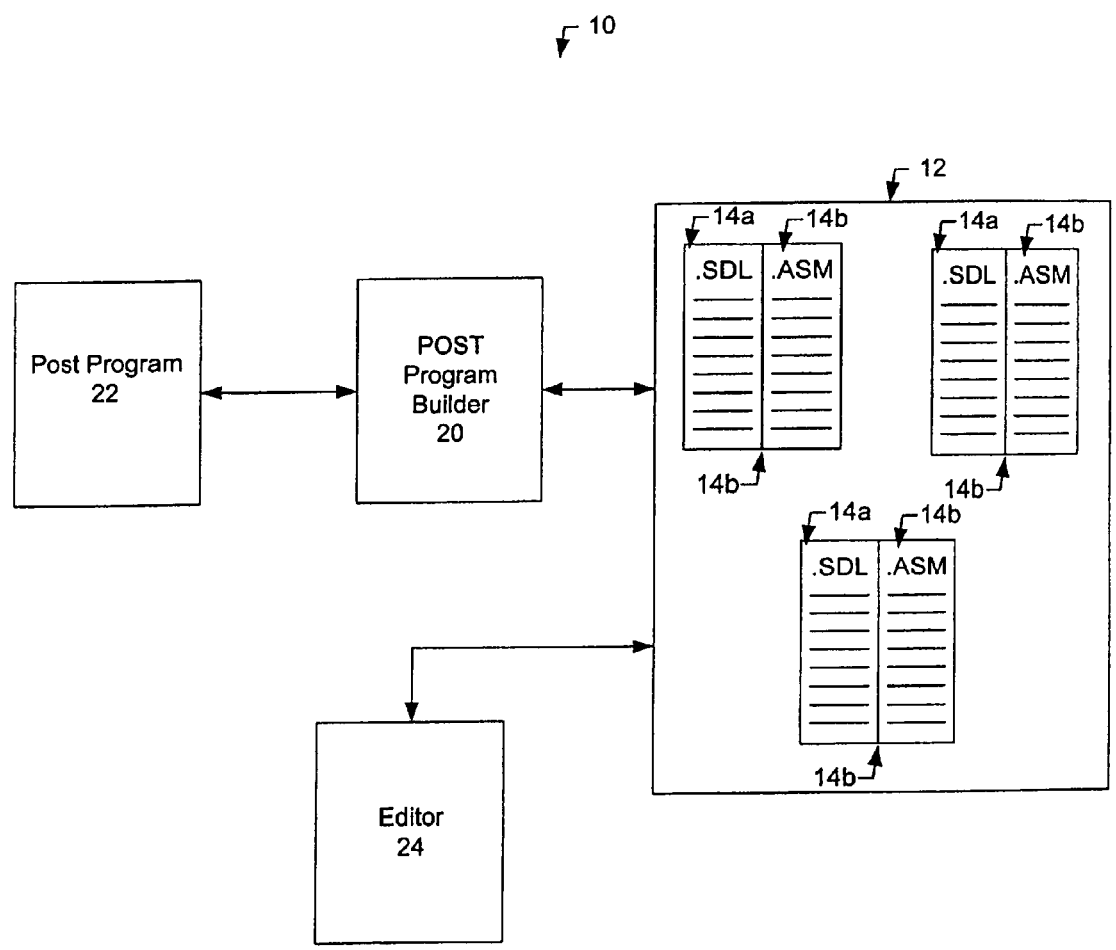

Having thus described the invention in general terms, reference will now be made to the accompanying drawings, which are not necessarily drawn to scale, and wherein:

FIG. 1 is a block diagram illustrating the operations of the system of the present invention to create a customized POST program according to one embodiment of the present invention.

Figure 2:
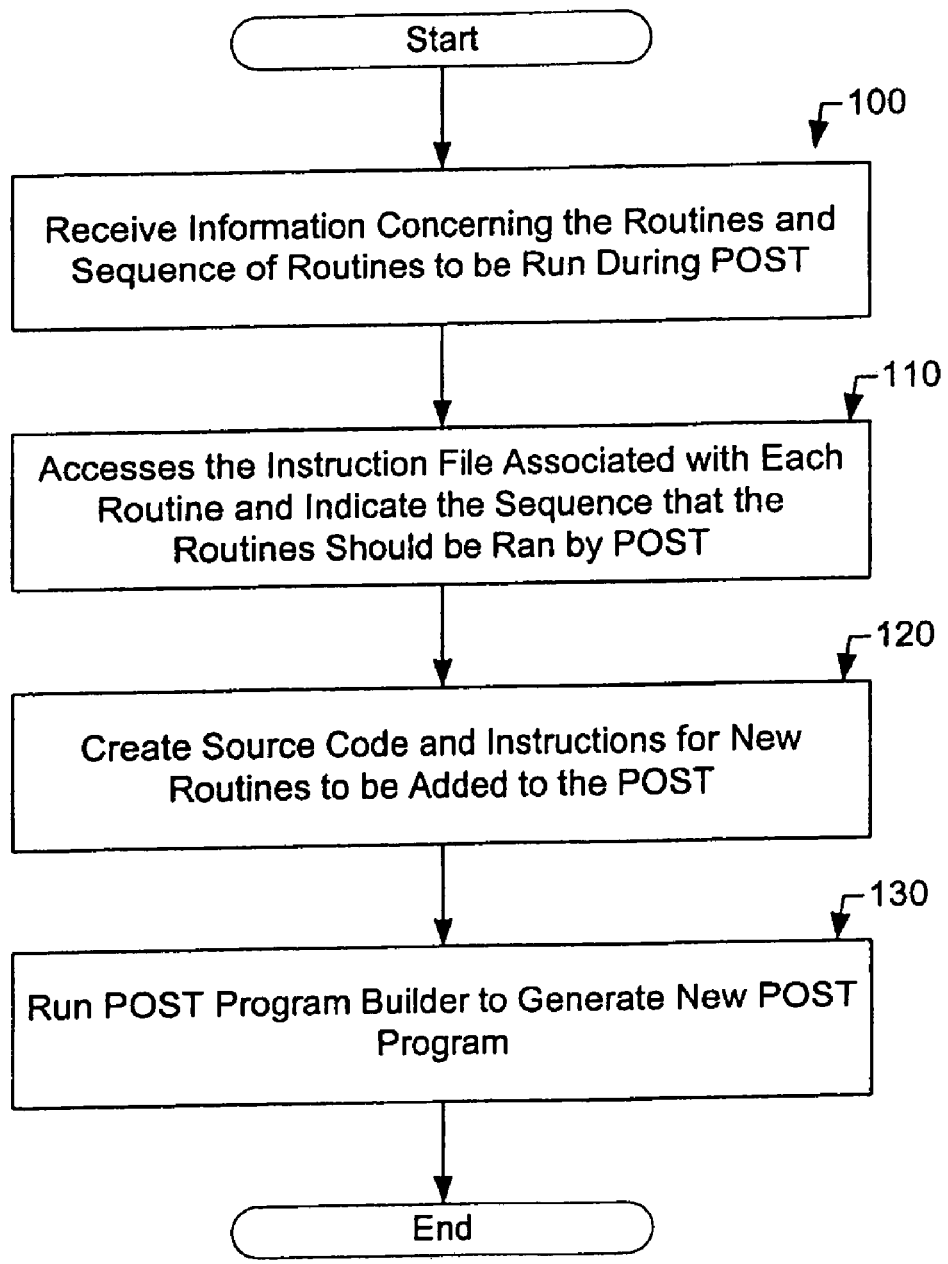

FIG. 2 is a block diagram illustrating the steps involving the system of the present invention to create a customized POST program according to one embodiment of the present invention.

Figure 3:
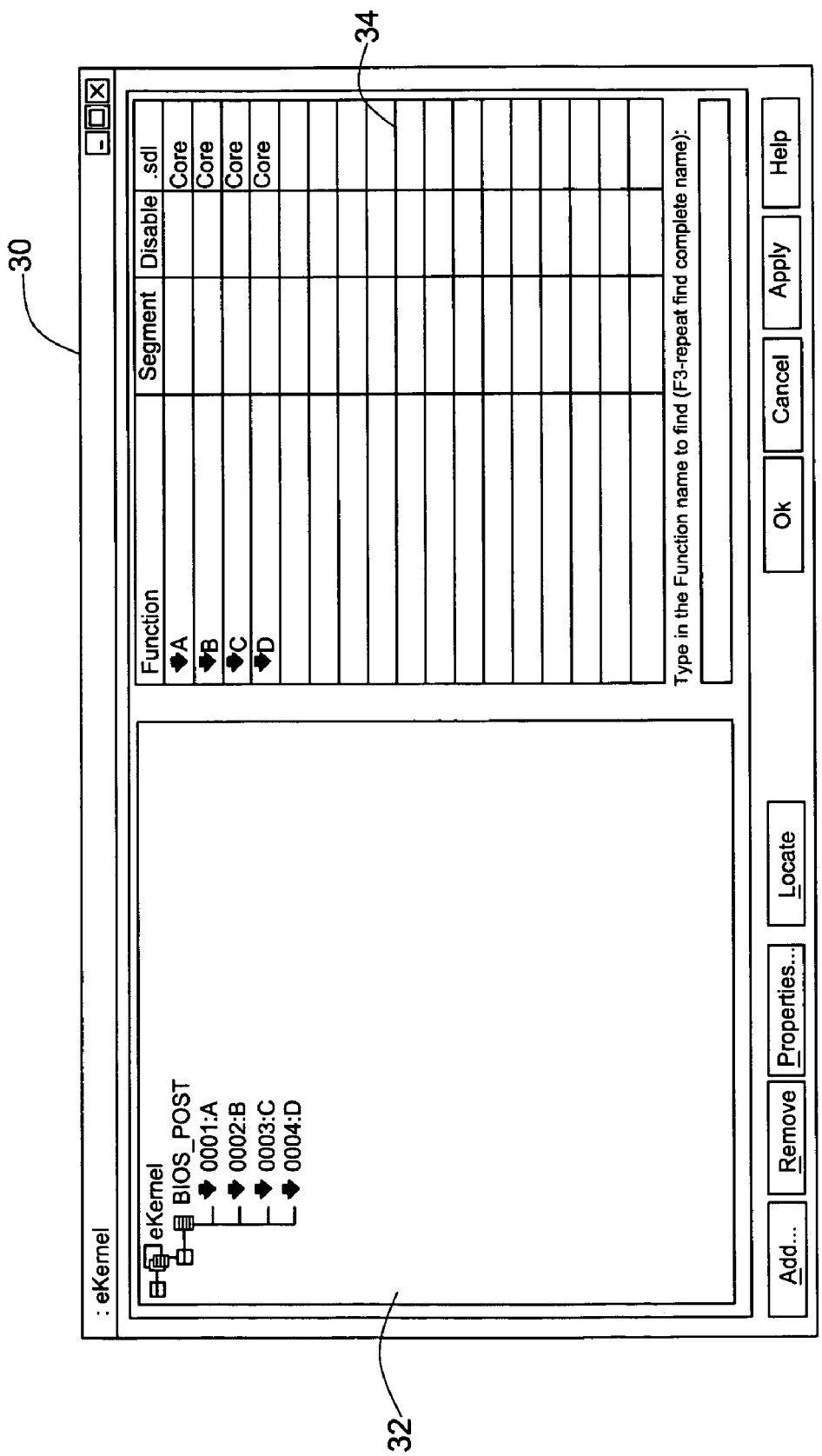
Figure 4B:
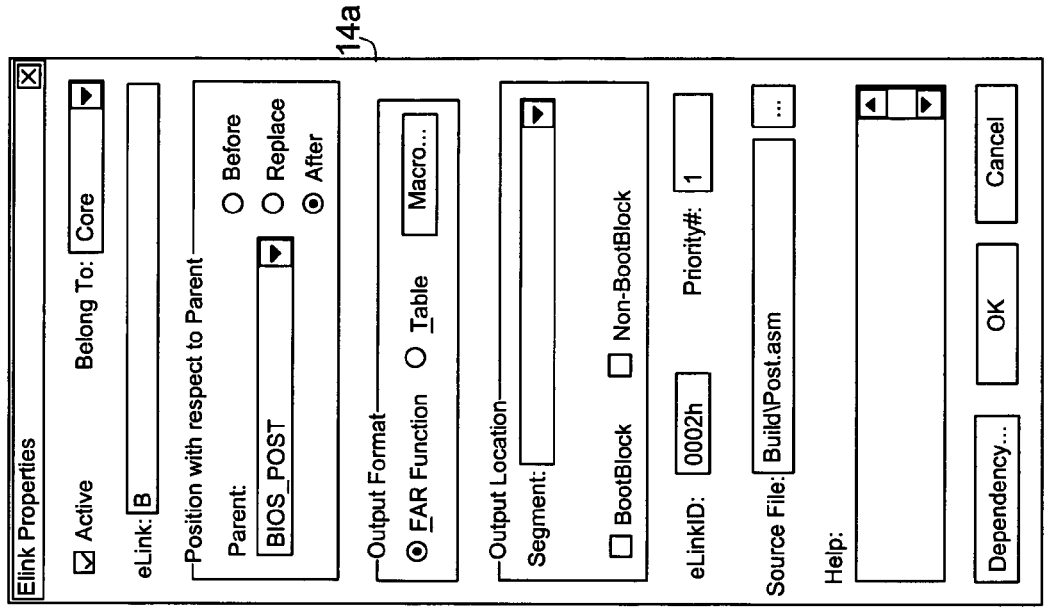
Figure 4A:
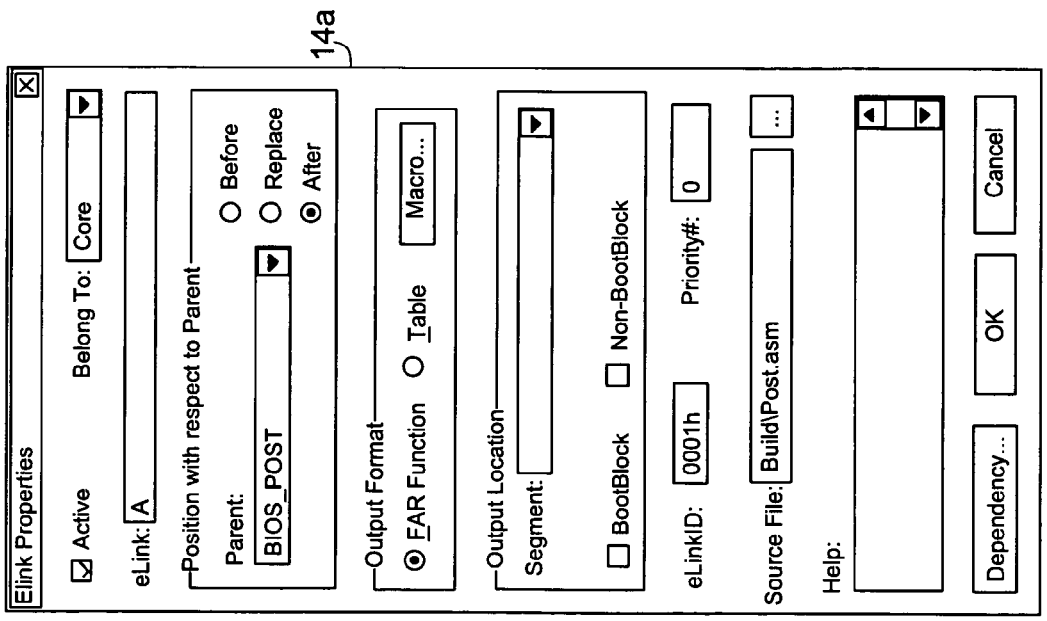

FIG. 3 is a screen depiction of the arrangement of the routines for a POST program generated by the graphical editor of the present invention.

FIGS. 4A–4D are graphic representations of the instruction files for core routines generated by the graphical editor of the present invention.

FIG. 5 is a graphical depiction of the POST program generated by the POST program builder of the present invention according to one embodiment.

Figure 6A:
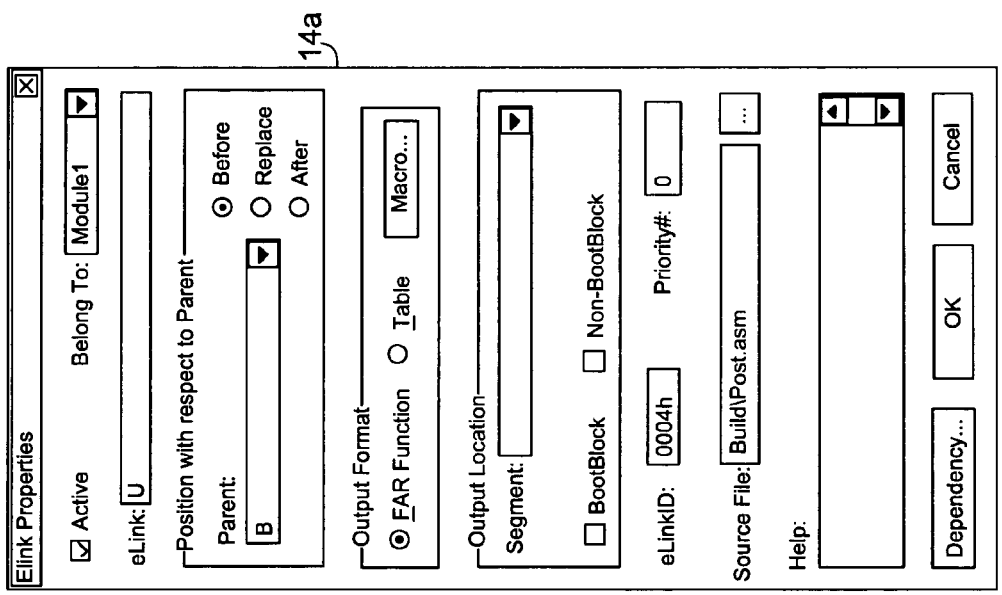

FIG. 6A is a graphic representation of the instruction file for an add-on routine generated by the graphical editor of the present invention.

Figure 6B:
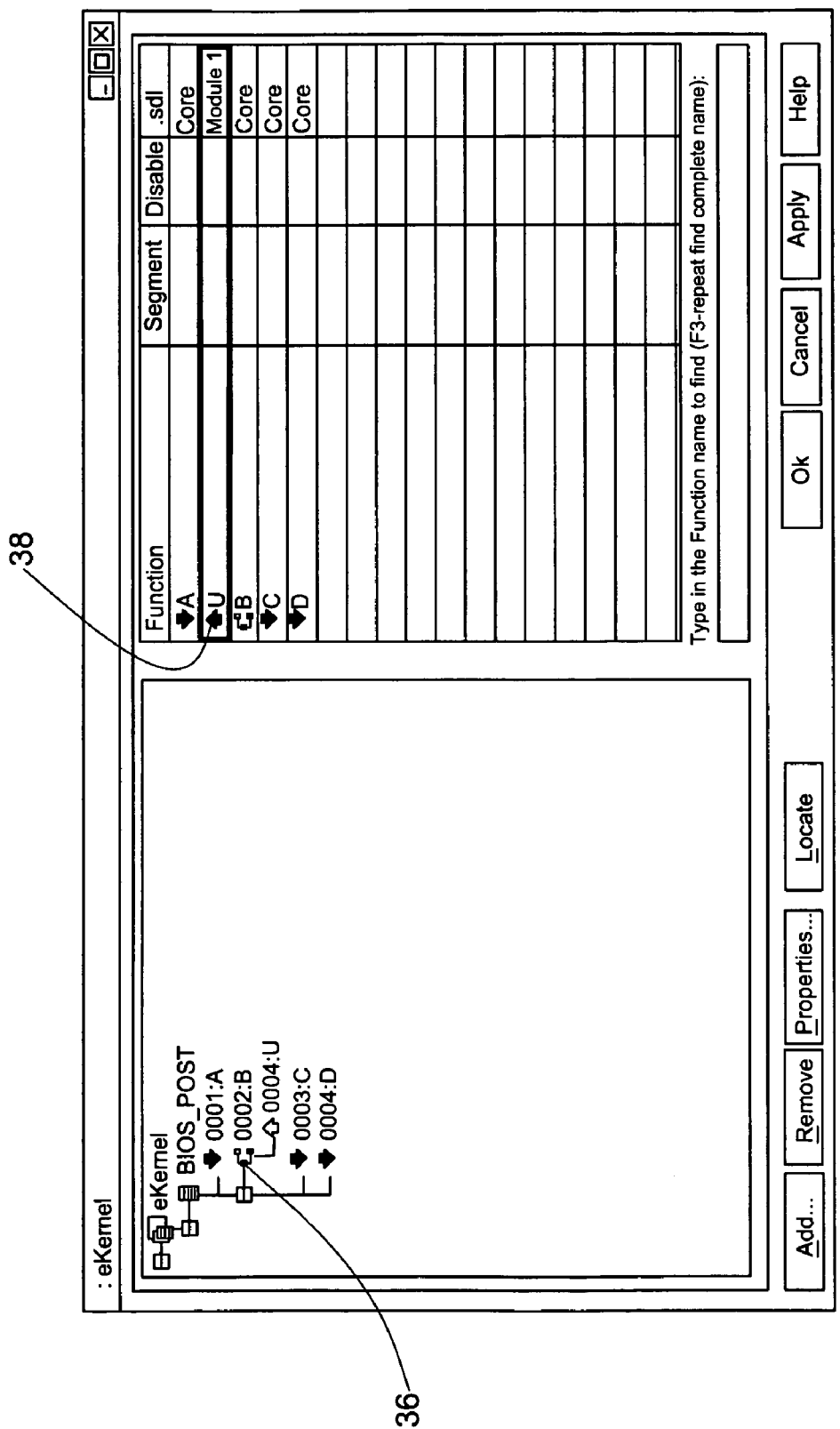

FIG. 6B is a screen depiction of the arrangement of the routines for a POST program generated by the graphical editor illustrating the addition of an add-on file.

FIGS. 7A and 7B are graphic representations of the instruction files for two add-on routines generated by the graphical editor of the present invention.

Figure 7C:
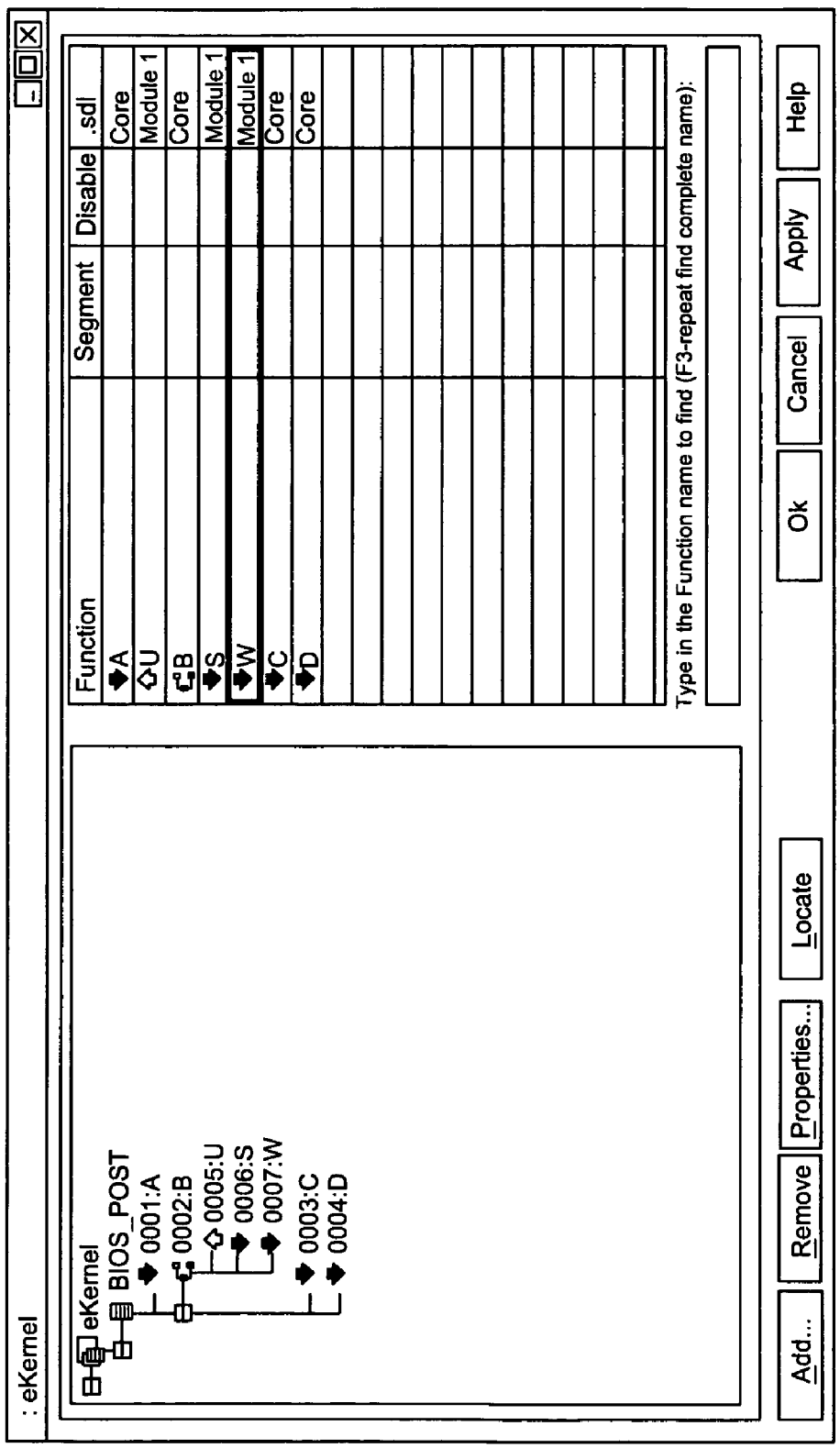

FIG. 7C is a screen depiction of the arrangement of the routines for a POST program generated by the graphical editor illustrating the addition of two add-on files.

Figure 8A:
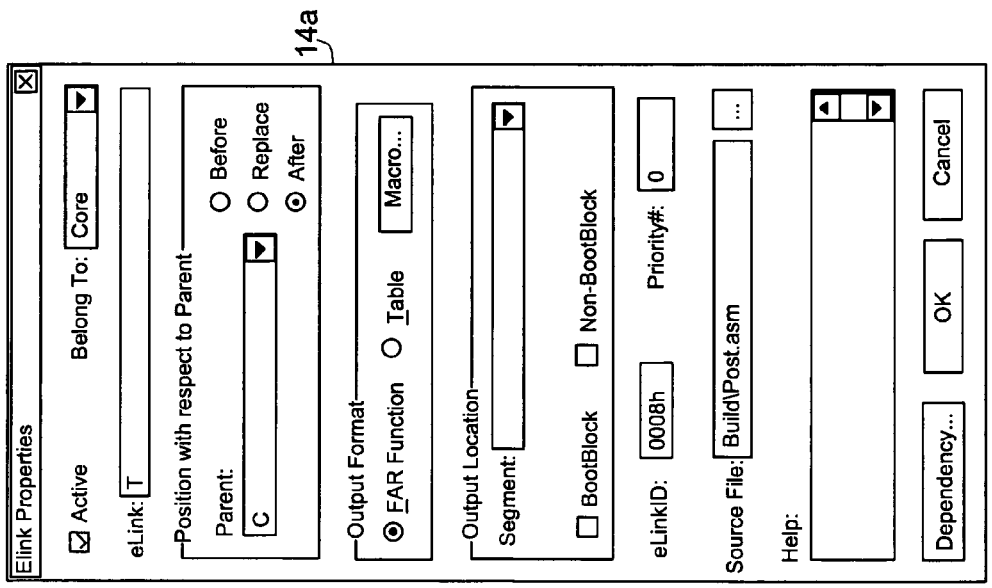

FIG. 8A is a graphic representation of the instruction file for an add-on routine generated by the graphical editor of the present invention.

Figure 8B:
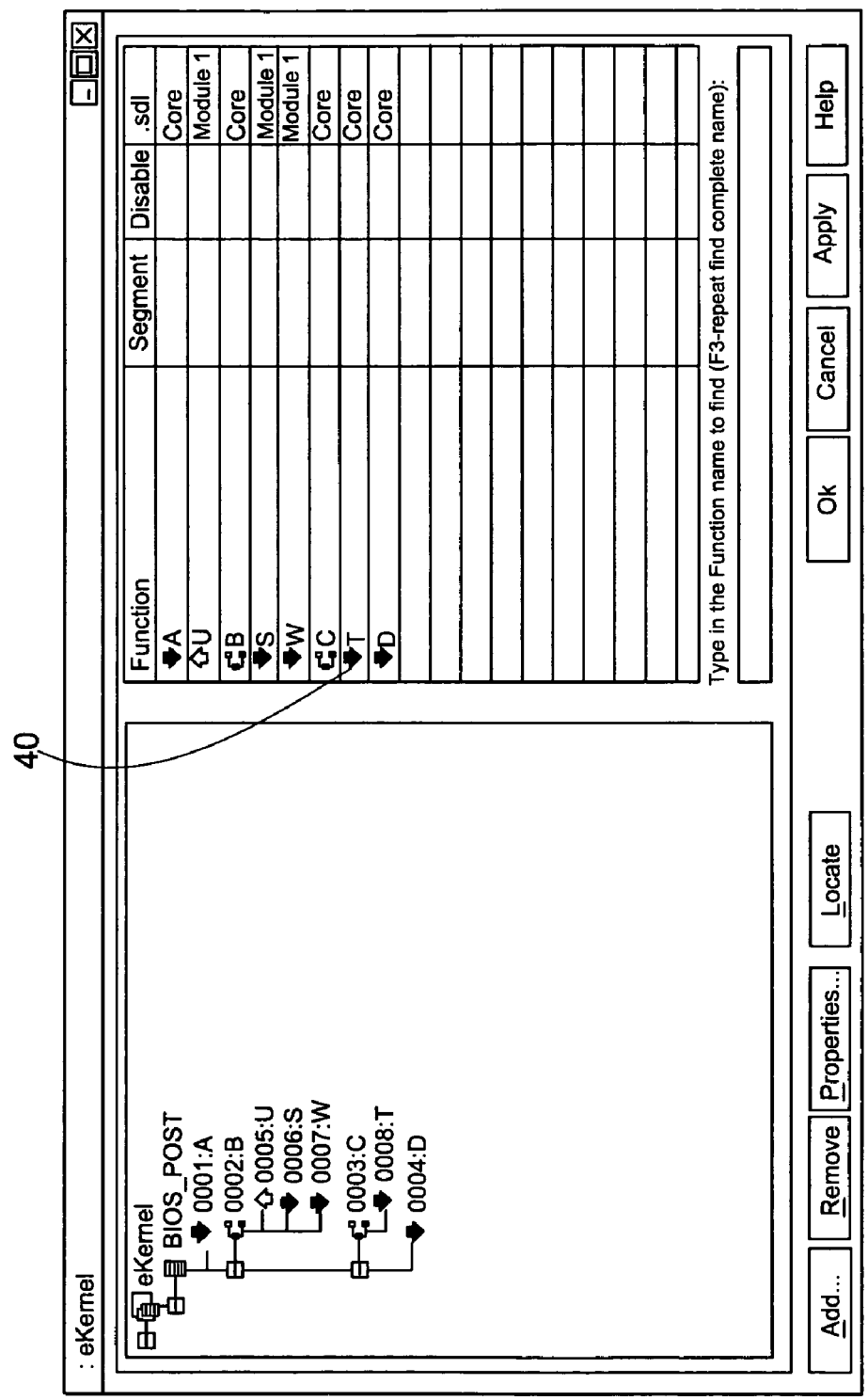

FIG. 8B is a screen depiction of the arrangement of the routines for a POST program generated by the graphical editor illustrating the addition of an add-on file.

Figure 9A:
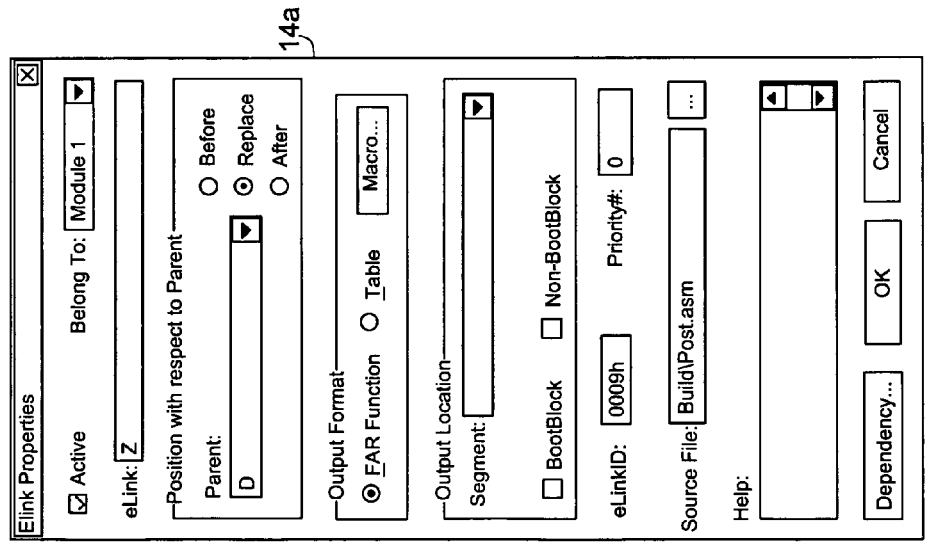

FIG. 9A is a graphic representation of the instruction file for an add-on routine generated by the graphical editor of the present invention.

Figure 9B:
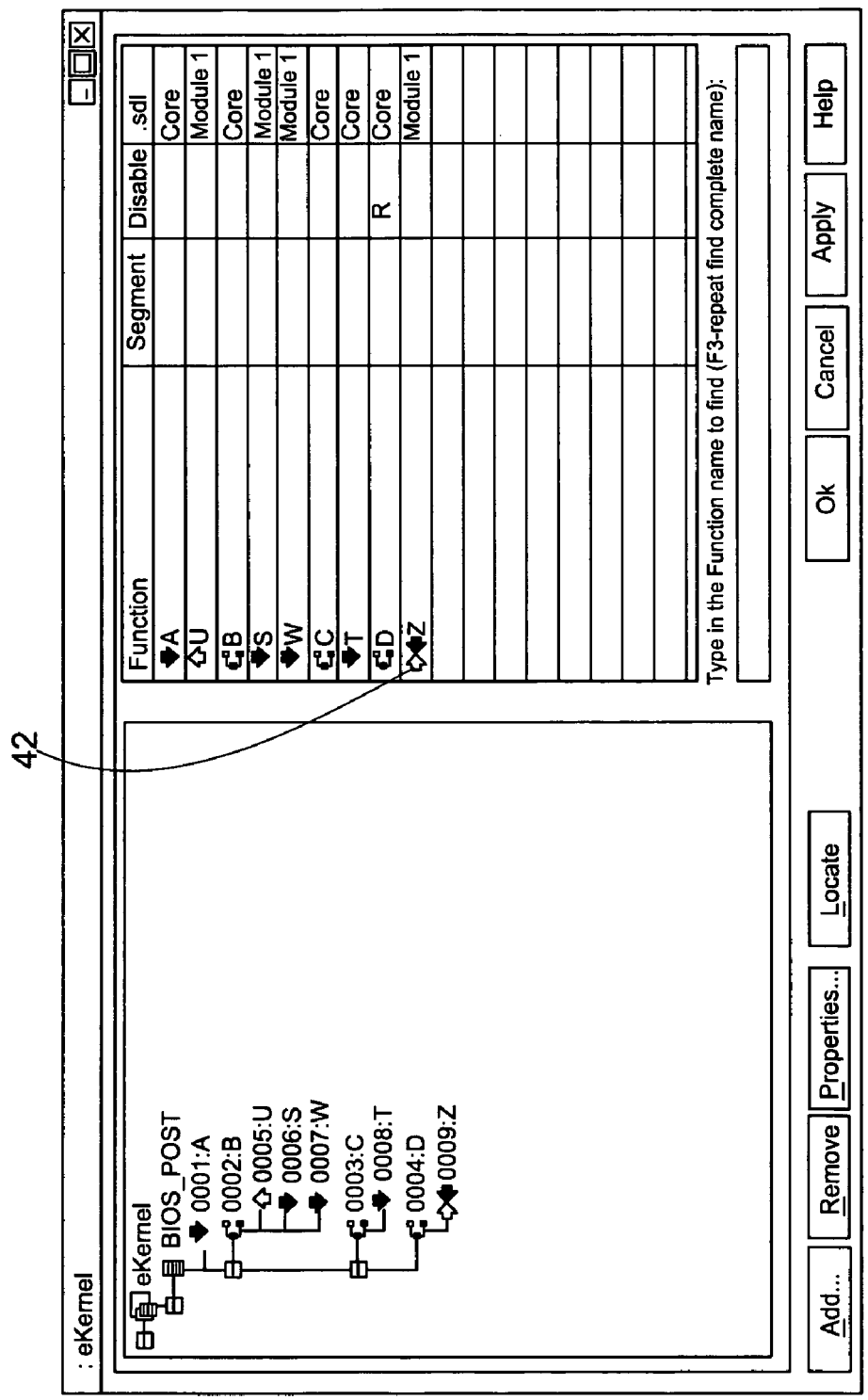

FIG. 9B is a screen depiction of the arrangement of the routines for a POST program generated by the graphical editor illustrating the addition of an add-on file.

FIG. 10 is a graphical depiction of the POST program generated by the POST program builder of the present invention according to one embodiment.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 is a graphical illustration of one embodiment of the present invention. Specifically, the system 10 of the present invention, according to one embodiment, includes a computer readable medium 12 containing a plurality of routines 14 that are or could be used as part of POST. The routines are stored at different locations in the computer readable medium and can be accessed using a call or pointer, which indicates their location in the computer readable medium. Within each routine 14, there are two separate files, 14a and 14b. One of these files includes the program source code associated with the routine and is referred to as the source code section 14b. This file typically has an extension .ASM. The other file is the instruction section 14a. This file includes editable information that explains where the routine is to be inserted in the sequence of routines ran during POST. This file typically has an extension .SDL.

With reference to FIG. 1, the system of the present invention also includes a POST program builder 20. The POST program builder is used to build the POST program 22. Specifically, the POST program builder accesses the instruction .SDL file associated with each routine 14 and from the instructions of each instruction file, the POST program builder 20 places calls for each routine in the proper sequence in the POST program. As such, the POST program 22, once generated, includes calls or pointers, to each routine to be run during the power on self test of the computing system, with the calls listed in the sequence for which each routine is to be run.

The system of the present invention also includes an editor 24. The editor allows the POST designer to access the instruction section 14a of each routine 14, edit these instructions, and save the changes to the instructions. In one advantageous embodiment discussed later below, the editing program 24 has a graphical interface allowing the POST designer to edit the instruction section for each routine and view the sequence that the routines will be run in the POST program.

With regard to FIG. 2, in general terms, during generation of the POST program, the POST designer initially receives information from the manufacturer of the hardware components of the computing system concerning the routines and sequence of routines to be run during the power on self test. (See step 100). Based on this information, the POST designer, using the editor 24, accesses the instruction file 14a associated with each routine 14 and indicates the sequence that the routines should be ran by POST. (See step 110). The POST designer may also program and add additional routines if requested by the manufacturer. In this instance, the POST designer creates the source code for the routine and saves this in a source file 14b (.ASM). The POST designer also creates an instruction file 14a .SDL for the routine that indicates when the routine is to be run by POST. (See step 120). After the instruction file for each routine has been edited, the POST designer next runs the POST program builder 20. (See step 130). The Post program builder using the information from each instruction file associated with each routine, builds the POST program by including calls or pointers for each routine in the POST program in the order in which the routines are to be run.

As mentioned, the instruction files 14a of each routine 14 collectively indicate to the POST program builder 20 the sequence with which the routines should be called by the POST program 22. Each of the instruction files includes information that relates to when the routine should be run by POST with regard to the other routines. Specifically, as mentioned above, there are set of core routines that are typically run in any POST program. These core routines may be standard routines such as chip set initialization, IRQ routing etc. The routines in the core category are a first set of routines that are defined in priority relative to each other. The instruction for each of these routines includes information indicating its priority relative to the other routines in the core category. The remaining routines are considered add-on routines. These are routines that are either less frequently used in POST or are routines that have been specifically coded for the specific computing system. These may include logos and other information.

The add-on routines are defined based on their relation to one of the core routines. Specifically, an add-on routine will reference one of the core routines as a parent, and will provide information to the POST program builder as to its sequence with regard to the parent to which it is associated. For example, the add-on routine may be designed to be run prior to or directly after the parent routine has been run by POST. Further, in some instances, the add-on routine may be designed to overwrite or take the place of the parent routine.

When building the POST program, the POST program builder will first place the calls or pointer for the core routines in the POST program. The POST program builder will then evaluate each of the add-on routines and will place the calls to these routines in the POST program builder in relation to their instructions concerning the core routine to which they are associated.

For example, let's say that there are four core routines called A, B, C, and D and five add-on routines U, 5, T, W, and Z. In this example, the core routines are all defined in terms of priority with regard to each other with A having the highest priority and D the least. Further, the U, 5, and W routines reference the B routine as their parent. The U routine includes instructions indicating that it is to be run before the B routine. The W routine includes instructions indicating that it is to be run after the B routine. The S routine includes instructions indicating that it is to be run after the B routine but has a priority higher than W, meaning it is executed before W. Further, the T routine references C routine and has instructions indicating that it be run after the C routine. Finally, the Z routine references D as its parent and has instructions to replace the D routine with the Z routine.

In this instance, the POST program builder initially accesses the instruction file for each of the core routines A, B, C, and D and places calls for the routines in the proper sequence in the POST program as illustrated below:

```
BIOS_POST PROC FAR PUBLIC
    call A
    call B
    call C
    call D
    ret
BIOS_POST ENDP
```

Next, the POST program builder reads the instructions for each of the add-on routines and places the calls for these routines in the proper sequence in the POST program as illustrated in the final POST program below:

```
BIOS_POST PROC FAR PUBLIC
    call A
    call U
    call B
    call S
    call W
    call C
    call T
    call Z
    ret
BIOS_POST ENDP
```

As such, when complete, the POST program will include all of the routines needed to initialize and test the hardware of the computing system with the routines ran in the proper sequence as required by the computer system manufacturer.

Importantly, as previously discussed, the system and method of the present invention offer several advantages over conventional POST building methods. Specifically, by placing each of the routines in separate location in memory and using calls or pointers in the POST program to initiate the routines, the routines can be individually edited or changed without requiring testing, validation, etc. for the entire POST program. Further, the sequence with which the routines are ran by POST can be easily altered by editing the instruction section for each routine, instead of rewriting, moving, or inserting code into the POST program. Similarly, revisions or patches may be made to existing POST programs in the field by placing the patches or revisions in separate routines with instructions on how the routines are to be call in the POST program. Once the revision or patch routines are installed in the computing system, the POST program builder can be reran so as to incorporate the new routines into the POST program.

As mentioned above, the creation or editing of the instruction files 14a associated with each routine 14 can be done using a graphical editor. The following discussion describes the use of a graphical editor and provides further insights as to the information located in the instruction section 14a for each routine. Specifically, the following discussion illustrates how the example above for routines, A–D, U, 5, T, W, and Z can be implemented using a graphic editor 24.

Specifically, FIG. 3 illustrates a display 30 of a graphic editor for creating the instruction file 14a for the routines 14 to be used in a POST program. As can be seen, the first half 32 of the screen illustrates the POST program with each call to the core routines listed in order of priority as they should be run from POST. The second half 34 of the screen illustrates each of the routines with an indication of their .SDL files. By clicking on one of the routines, the instruction file 14a of the routine can be displayed. For example, FIGS. 4A–4D respectively illustrate graphically the instruction files for A–D routines. As can be seen, the instruction file includes the following information:

Active; toggled on or off to indicate whether the routine will be used with this particular POST program Belong to; location of module in memory where routine is stored eLink name of routine Parent; name of high priority routine from which this routine depends-in this case, routine A is a core routine and depends from the main POST program Position w/; current routine's priority with respect to parent either (before, respect to Parent after, or in place of)

eLink ID; ID for the routine priority #; priority of routine with respect to the other core routines As can be seen the priority for the A, B, C, and D routines is respectively 0, 1, 2, 3 indicating that the routines are to be called in order from A to D by the POST program.

If the POST program was generated at this point, it would include call outs for only the A to D routines. For example, FIG. 5 illustrates graphically a POST program generated by the POST program builder of the present invention using only the routines for A to D.

After the core routines have been created and their instruction files properly defined, the POST designer can now add the additional add-on routines U, 5, T, W, and Z. Specifically, first the POST designer creates the source code 14b portion for each routine. Next, the POST designer edits the instruction file 14a for each routine in accordance with the rules set for each routine, as discussed previously. For example, FIGS. 6A and 6B respectively illustrate generation of the instruction file for the U routine and how the routine looks graphically in relation to the parent routine B. Specifically, as shown in FIG. 6A, the routine U is defined relative to the parent routine B and is selected to occur before routine B. Further, FIG. 6B illustrates graphically, a tree symbol 36 beside routine B indicating that routines are depended from it, and an arrow 38 is beside routine U indicating that it is to be executed before the B routine.

FIGS. 7A–7C illustrate the creation of the instruction files for add-on routines S and W. Specifically, as can be seen from FIGS. 7A and 7B, both routines are to be executed after the parent routine B, as so indicated. Further, routine S is to be executed prior to routine W, and for this reason, routine S has a priority of 0 and W has a priority of 1. As illustrated in FIG. 7C, the S and W routines are properly listed after routine B, with routine S appearing ahead of W due to its higher priority.

FIG. 8A illustrates generation of the instruction file for the T routine, which depends from parent routine C and is executed after routine C. FIG. 8B illustrates T properly listed as executing after routine C by down arrow 40.

Further, FIGS. 9A and 9B illustrate generation of the instruction file for the Z routine. As can be seen in FIG. 9A, the parent D routine is replaced by the Z routine. This is also shown in FIG. 9B, which illustrates that routine D is disabled. The facing arrows 42 also provide a visual indication that the Z routine replaces the parent D routine.

After all of the add-on the POST developer has defined routines and the instruction file for each routine configured, the POST program builder using the instruction file for each routine generates a POST program. The POST program includes the call or pointer to each of the routines listed in a sequential order as defined by the instruction files of each routine. For example, FIG. 10 illustrates the POST program generated by the POST program builder of the present invention using the instruction files from routines A–D, U, 5, T, W, and Z.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for creating a customized power on self test (POST) program for use in a computing system, said system comprising:

a set of routines stored on a computer readable medium wherein each routine includes an associate pointer indicating where the routine is stored and an instruction section containing instructions indicating the order in which said routine should be run by the POST program; and a POST program builder for accessing said routines and based on the instruction associated with each of said routines, creating a POST program having pointers for running the routines, wherein the pointers are listed in order based on the instructions associated with each routine.

2. A system according to claim 1 further comprising an editor for editing the instruction sections associated with each routine.

3. A system according to claim 2, wherein the editor is for saving changes to the instruction section and having an interface for viewing the sequence that each routine will be run in the POST program.

4. A system according to claim 3, wherein the editor is for viewing, editing, and saving the source code section of each routine.

5. A system according to claim 2, wherein the editor is for creating, viewing and saving the routines.

6. A system according to claim 1, wherein each routine is stored in a unique location.

7. A system according to claim 1, wherein each routine further comprises a source code section containing instructions for performing the functions of each routine.

8. A system according to claim 1, wherein the POST program builder comprises a computer program product stored on a computer-readable medium.

9. A system according to claim 1, wherein each routine within the POST program are tested and validated separately.

10. A method for creating a customized power on self test (POST) program for use in a computing system, said method comprising the steps of:
   providing a set of routines stored on a computer readable medium wherein each routine includes an associate pointer indicating where the routine is stored and an instruction section containing instructions indicating the order in which said routine should be run by the POST program;
   analyzing the instruction associated with each routine to determine the order in which the routine should be run by the POST program; and
   creating a POST program having pointers for running the routines, wherein the pointers are listed in order based on the instructions associated with each routine.

11. A method according to claim 10 further comprising the step of editing the instruction section associated with the routines.

12. The method of claim 11, further comprising the steps of:
   saving changes to the instruction section; and
   viewing the sequence that each routine will be run in the POST program.

13. The method of claim 11, further comprising the steps of viewing, editing, and saving the source code section of each routine.

14. The method of claim 10, wherein each routine is stored in a unique location on the computer readable medium.

15. The method of claim 10, wherein each routine further comprises a source code section containing instructions for performing the functions of each routine.

16. The method of claim 10, further comprising creating, viewing and saving the routines.

17. The method of claim 10, further comprising testing and validating each routine within the POST program separately.

18. A computer program product for creating a customized power on self test (POST) program for use in a computing system, the computer program product comprising a computer-readable storage medium having computer-readable program code portions stored therein, the computer-readable program code portions comprising:
   a first executable portion capable of providing a set of routines stored on a computer readable medium wherein each routine includes an associate pointer indicating where the routine is stored and an instruction section containing instructions indicating the order in which said routine should be run by the POST program;
   a second executable portion capable of analyzing the instruction associated with each routine to determine the order in which the routine should be run by the POST program; and
   a third executable portion capable of creating a POST program having pointers for running the routines, wherein the pointers are listed in order based on the instructions associated with each routine.

19. The computer program product of claim 18, wherein the first executable portion is further capable of storing each routine in a unique location on the computer readable medium.

20. The computer program product of claim 19, wherein the first executable portion is further capable of providing a source code section within each routine containing instructions for performing the functions of each routine.

21. A method for creating a customized power on self test (POST) program for use in a computing system, comprising:
   receiving information concerning one or more routines and a sequence in which said routines are to run in a POST program;
   accessing one or more instruction files associated with each routine and indicating the sequence in which the routines should run in the POST program;
   creating a source code and one or more instructions for the routines to be added to the POST program; and
   running a POST program builder to generate the POST program according to the retrieved information, accessed instruction files, and the created source code.

22. The method of claim 21, wherein each routine includes an associate call indicating a unique location where the routine is stored.

23. The method of claim 22, wherein the instruction files contain instructions indicating the order in which the associated routines should be run by the POST program.

24. The method of claim 23, wherein one or more instructions files associated with each routine are accessed using a graphical editor.

25. The method of claim 24, wherein the source code and the instructions for the routines to be added are created using the graphical editor.

26. The method of claim 25, wherein generating a POST program comprises:
   accessing the routines; and
   based on the instruction files associated with each routine, creating a POST program having the associated call for each routine, wherein the associated calls are listed in order based on one or more instructions within each instruction file.

27. The method of claim 26, wherein each routine is capable of separate validation and testing.

* * * * *